June 30, 1936.                    H. DREW                    2,046,108
                            WINDSHIELD WIPER
                           Filed June 22, 1931

Inventor
Harold Drew
By Blackmore, Spencer & Hink
                        Attorneys Patented June 30, 1936

2,046,108

UNITED STATES PATENT OFFICE 2,046,108

WINDSHIELD WIPER

Harold Drew, Luton, England, assignor to General Motors Corporation, Detroit, Mich., a corporation of Delaware Application June 22, 1931, Serial No. 545,993
In Great Britain September 3, 1930

16 Claims. (Cl. 15—255)

This invention relates to windscreen wipers for motor vehicles.

Windscreen wipers are frequently actuated by mechanism located at the lower border of the windscreen and with such, when the windscreen, which is pivoted at its upper border, is opened, the whole mechanism including the wiper motor is carried bodily up with the windscreen. This practice is objectionable for two reasons. First, the bulk of the wiper motor seriously obstructs the view of the driver when the windscreen is open. Second, the construction of the windscreen frame is considerably complicated by the necessity for carrying the air line or electric leads, which supply energy to the wiper motor, up to the hinge at the top of the windscreen, where a flexible connection has to be provided.

The object of the present invention is to avoid the objectionable features mentioned above.

For this purpose, according to the invention, the windscreen wiper is arranged to become automatically disconnected from its actuating mechanism when the windscreen on which the wiper is mounted is opened, and automatically reconnected thereto when the windscreen is closed, and the actuating mechanism is mounted on a fixed portion of the vehicle so as not to participate in the opening and closing movements of the windscreen.

For example, the wiper arm bearing the wiper blade is fast on a spindle which is journalled and oscillates in a bush extending through the glass or the moving border frame of the windscreen near or at the bottom thereof. On the inwardly directed side of the windscreen glass, a radially notched or slotted disc is fast on the spindle of the wiper arm. A crank arm of spring strip metal is clamped fast on the oscillating spindle of the wiper motor, which latter is contained in a casing mounted on stationary brackets on the top of the usual instrument panel, with both spindles in approximate alignment. The crank arm has a peg protruding towards and engaging in the notch or slot in the disc fast on the wiper arm spindle.

When the windscreen is opened, the disc is moved therewith out of engagement with the peg of the spring crank arm.

When the windscreen is again closed, the disc either engages by its notch or slot with the peg on the spring crank arm or bears by its solid portion against such peg, which latter, on the crank arm next undergoing angular displacement on actuation of the mechanism, eventually snaps into the notch or slot.

To avoid the wiper arm falling completely over when the windscreen is opened and the wiper arm is therefore disconnected from the actuating mechanism, the disc has two shoulders which engage abutments which limit the angular movement of the wiper arm in either direction.

Figure 2:
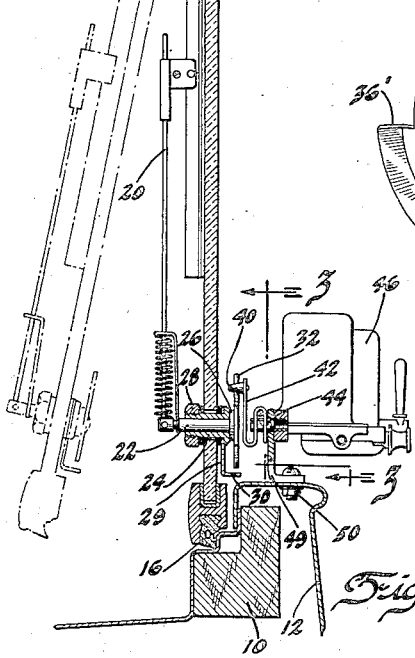
Figure 2 is an enlarged section through the structure of Figure 1 taken through the windshield wiper.

Referring to the drawing, the numeral 2 indicates an automobile as a whole. The front portion of the automobile is provided with the windscreen 4 hinged as at 6 to swing outwardly as shown in dotted outline in Figure 2. The numeral 8 indicates the upper framing of the windshield while the numeral 10 indicates the lower framing. The lower framing includes a portion of the instrument panel 12. The windshield 4 is provided with the usual rubber weather strips 14 and 16 to prevent the ingress of rain when it is in closed position.

The windscreen wiper is indicated at 18 mounted on the usual arm 20 attached to the spindle or shaft 22 journalled in a bush 24 permanently secured to the windshield by means of the head 26 and the nut 28. Suitable rubber or fabric washers are interposed between the head 26 and nut 28 and the glass of the windshield. A suitable arm 29 having a right angularly projecting end 30 is secured between the head 26 and the washer to act as a stop, as later will be explained.

Figure 3:
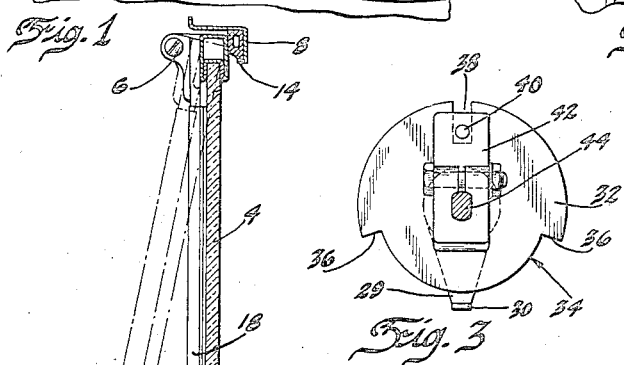
Figure 3 is a detail view on the line 3—3 of Figure 2.

Secured to the end of the shaft 22 is the disc 32, best shown in Figure 3. The disc is provided with the cut-out portion 34 provided with shoulders 36 which strike against the end 30 of the arm 29 to limit the throw of the disc and to prevent the windshield wiper from swinging off the windshield. The disc is provided with the recess 38 in which there is received the peg or projection 40 mounted on the end of a spring crank arm or finger 42. The spring finger 42 is of the shape shown in Figure 2 and has its other end rigidly secured to the spindle shaft 44 of the motor or operating means 46. The spindles 22 and 44 are in alignment. The motor 46 may be of the electrical type or operated from the engine manifold by air suction provided through a pipe 48. The motor 46 is mounted on the upper portion of the instrument board 12 (or on the framing of the windshield) by means of a bracket 49 and bolt and nut 50.

When it is desired to raise the windshield on its hinge 6, the connection between the peg 40 and the recess 38 becomes disengaged so that the motor 46 and spring finger 42 will not move with the windshield. This is for the reason pointed out in the statement of invention. When the windshield 4 is returned to the full line position of Figure 2, the recess 38 of the disc 32 again will pick up the peg 40. If for any reason the recess 38 does not mate with the peg 40, the spring finger 42 is sufficiently resilient to permit the disc to push the peg backward. When the motor 46 is started, the peg 40 will soon pick up the slot 38 so that the reciprocatory movement of the motor will swing the windshield wiper 18 across the windshield in the usual way.

Figure 1:
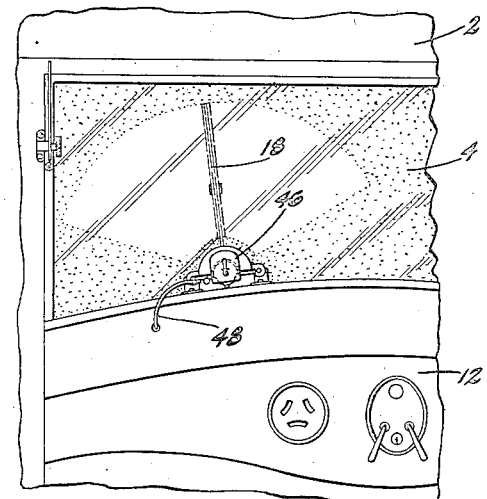
Figure 1 is a front view of a portion of an automobile showing the invention applied.
Figure 4:
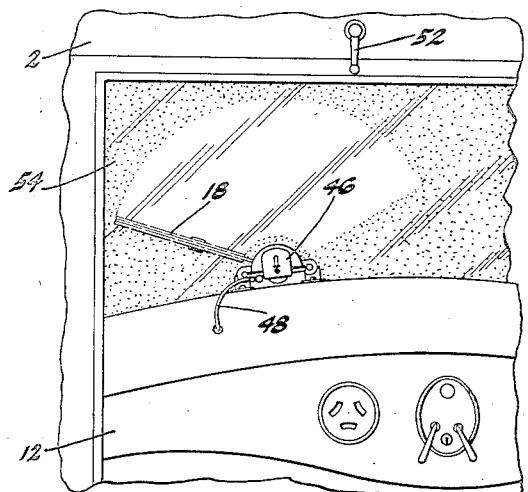
Figure 4 is a front view of a portion of an automobile having a windshield of the vertically reciprocating type.
Figure 5:
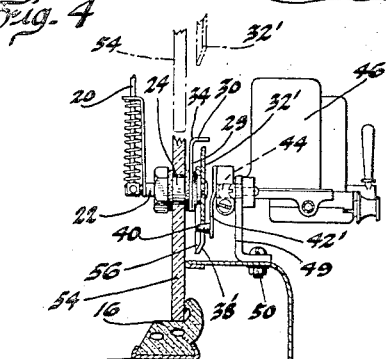
Figure 5 is a sectional view through the structure of Figure 4 taken through the windshield wiper and showing in dotted outline the position of the windshield when raised.
Figure 6:
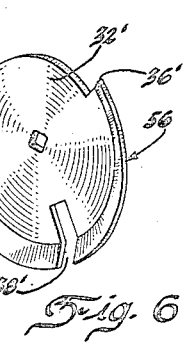
Figure 6 is a perspective view of the attaching disc used in Figure 5.

Figure 4 shows the invention applied to a vertically reciprocable windshield. The numeral 52 designates the crank arm used to operate the mechanism to raise and lower the windshield 54. The windshield wiper 18, arm 20, shaft 22, bushing 24 are the same as in the species of Figures 1 and 2. The arm 29 projects upwardly instead of downwardly and the disc 32 of the species of Figures 1 and 2 takes the form shown in Figure 6. This disc 32' is attached to the shaft 22 in any suitable way and is provided with a recess 38' and the shoulders 36', the latter of which strike against the arm or angularly bent end 30 of the arm 34 to limit the movement of the wiper. The spring crank or arm 42' in the species of Figures 4 and 5, is differently shaped but performs the same functions as spring arm 42 in the species of Figures 1 and 2. The arm has the peg or projection 40 which mates with the slot 38' in the disc 32'. As the motor 46 operates to move its shaft 44, it will swing the spring arm 42'. The peg 40 in the slot 38' will operate the shaft 22 and reciprocate the wiper arm 18 across the windshield 54. When it is desired to raise the windshield 54, the operator turns the crank 52. The raising of the windshield to the dotted line position 54 in Figure 5 will raise the disc 32' from the peg 40 and motor 46 so that the motor is disconnected. When the windshield 54 is lowered, the slot 38' will engage the peg 40 to bring the parts into operative position. If the slot 38' should not conform to the position of the peg 40, the tapered edge 56 of the disc 32' will press the peg 40 backward against the tension of the spring arm 42'. The restarting of the motor will cause the peg 40 again to enter the slot 38' to return the parts to operative position.

The dotted line position in Figure 5 shows the raised position of the glass and of the disc 32'.

I claim:

1. In a wiper mechanism for a pivotally mounted swingable window, a framing for the window, a wiper blade, means for oscillatably mounting said blade in the window margin adjacent the edge opposite the pivot, means permanently mounted on the framing for operating the blade, said two means including a connection enabling said last-named means to become disengaged from the first-named means when the window is swung on its pivot.

2. In a wiper mechanism for a movable window, a framing for the window, a wiper blade, means for oscillatably mounting said blade in the window margin adjacent the lower edge thereof, means permanently mounted on the framing for operating the blade, said two means including a connection enabling said last-named means to become disengaged from the first-named means when the window is moved.

3. In a wiper mechanism for a movable window, a framing for the window, a wiper blade, means oscillatably mounting the said blade in the window adjacent the edge, operating means, means interconnecting said operating means and said first-named means and including a spring arm, said interconnection enabling said first-named means and said arm to become disengaged upon movement of the said window.

4. In a wiper mechanism for a movable window, a framing for the window, a wiper blade and means for oscillatably mounting it in the window to move therewith, operating means, means interconnecting the operating means and the first-named means including a spring arm, said interconnection enabling said first-named means and said arm to become disengaged to disconnect the operating means when the window is moved.

5. In a wiper mechanism for a movable window, means oscillatably to mount a wiper blade in the window including a shaft, a connecting member mounted on the shaft, operating means, means interconnecting the operating means and the connecting member to operate the wiper blade, said means enabling said interconnecting means and connecting member to become disengaged when the window is moved to disconnect the wiper from the operating member.

6. In a wiper mechanism for a movable window, means oscillatably to mount a wiper blade in the window including a shaft, a connecting member mounted on the shaft, operating means, means interconnecting the operating means and the connecting member to operate the wiper blade, said means enabling said interconnecting means and connecting member to become disengaged when the window is moved to disconnect the wiper from the operating member, and means to limit the movement of the wiper blade when the operating means is disconnected.

7. In a wiper mechanism for a movable window, means oscillatably to mount a wiper blade in the window including a shaft, a connecting member mounted on the shaft, operating means, means interconnecting the operating means and the connecting member to operate the wiper blade, said means enabling said interconnecting means and connecting member to become disengaged when the window is moved to disconnect the wiper from the operating member, and means permanently mounted on the window and engageable with the connecting member to limit the movement of the wiper blade when the operating means is disconnected.

8. In a wiper mechanism for a reciprocable window, means oscillatably to mount a wiper blade on the window including a shaft, a connecting member mounted on the shaft, operating means, means interconnecting the operating means and the connecting member to operate the wiper blade, said means enabling said interconnecting means and connecting member to become separated when the window is moved in one direction to disengage the connecting member from the operating member and becoming reengaged upon movement of the window in the opposite direction.

9. In a window wiper, a wiper blade, wiper arm and wiper shaft oscillatably supported on a movable window structure, a driving mechanism carried by a fixed structure adjacent the window, and clutch mechanism for connecting the wiper shaft and driving mechanism, said clutch being disconnected by movement of the movable window structure carrying the wiper shaft.

10. In a window wiper, a wiper blade, wiper arm and wiper shaft carried by a movable window structure, a driving mechanism carried by a fixed structure adjacent the window, and clutch mechanism for connecting the wiper shaft and driving mechanism, said clutch mechanism being provided with cam surfaces whereby the mechanism automatically picks up the wiper shaft when the driving mechanism is operated and the wiper shaft is in registration with the driving shaft.

11. In combination with a movable window, a wiper carried by said window, the wiper having a shaft, a driving mechanism carried by a fixed support adjacent the window, a driving shaft extending from said mechanism in registration with the wiper shaft when the window is closed, an arm extending from the driving shaft, and a clutch for connecting the wiper shaft and said arm whereby the driving shaft operates the wiper shaft.

12. In a window wiper, a wiper blade, wiper arm and wiper shaft carried by a movable window structure, a driving mechanism oscillatably supported on a fixed structure adjacent the window, and means for detachably connecting the wiper shaft and driving mechanism, said means being disconnected when the window is opened and being automatically connected when the window is closed with the parts in registration with each other.

13. In a window wiper, a wiper blade, wiper arm and wiper shaft oscillatably supported on a movable window structure, a driving mechanism carried by a fixed structure adjacent the window, and clutch mechanism embodying parts respectively carried by the driving mechanism and wiper shaft and freely engageable and disengageable on movement of the window structure for connecting the wiper shaft and driving mechanism.

14. In a window wiper, a wiper blade, wiper arm and wiper shaft carried by a movable window structure, a driving mechanism carried by a fixed structure adjacent the window, and clutch mechanism having a part carried by the wiper shaft for connecting the wiper shaft and driving mechanism, said clutch including a spring-pressed member on the driving mechanism adapted to positively engage or disengage said part upon appropriate movement of the window structure to connect the wiper shaft and driving mechanism.

15. In a wiper mechanism for a movable window, a framing for the window, a wiper blade, means oscillatably mounting the said blade in the window adjacent the edge, said means including a horizontal shaft and a slotted disk secured to the inner end of the shaft, operating means, means interconnecting said operating means and said first named means including a spring arm which engages the slotted disk, said interconnection enabling said slotted disk and said arm to become disengaged upon movement of the window.

16. In a wiper mechanism for a movable window, a framing for the window, a wiper blade and means for oscillatably mounting it in the window to move therewith, said means including a horizontal shaft and a slotted disk secured to the inner end of the shaft, operating means, means interconnecting the operating means and the first named means including a spring arm, a peg on the arm which engages the sides of the slots in the disk, said interconnection enabling said slotted disk and said arm to become disengaged when the window is moved.

HAROLD DREW.